United States Patent [19]

Rudzinski

[11] Patent Number: 4,792,394

[45] Date of Patent: Dec. 20, 1988

[54] BAR SCREENING APPARATUS

[75] Inventor: Stanley P. Rudzinski, Chicago, Ill.

[73] Assignee: Rudz Enterprises, Inc., Ill.

[21] Appl. No.: 908,828

[22] Filed: Sep. 18, 1986

Related U.S. Application Data

[63] Continuation-in-part of Ser. No. 784,226, Oct. 4, 1985, abandoned.

[51] Int. Cl.[4] .............................................. B01D 35/16
[52] U.S. Cl. .................................. 210/159; 209/385; 210/162; 210/413
[58] Field of Search ................. 99/570; 209/379, 385, 209/389; 210/154, 159, 106, 162, 407, 413

[56] References Cited

U.S. PATENT DOCUMENTS

| | | | |
|---|---|---|---|
| 2,033,653 | 3/1936 | Schlapak et al. | 210/159 |
| 3,209,914 | 10/1965 | Nordell et al. | 210/159 |
| 4,265,750 | 5/1981 | Meunier | 210/159 |
| 4,289,619 | 9/1981 | Sampson | 210/159 |
| 4,472,273 | 9/1984 | Hagihara | 210/159 |

FOREIGN PATENT DOCUMENTS

| | | | |
|---|---|---|---|
| 148022 | 11/1902 | Fed. Rep. of Germany | 210/162 |
| 666765 | 8/1934 | Fed. Rep. of Germany | 210/159 |
| 42141 | 10/1907 | Switzerland | 210/162 |

*Primary Examiner*—Richard V. Fisher
*Assistant Examiner*—W. Gary Jones

[57] ABSTRACT

A bar screening apparatus for the efficient screening and removal of solid materials from a liquid flow stream. The bar screen includes a plurality of bars that are disposed in substantially parallel adjacent relation to each other and each have an upstream face disposed at an acute angle to the direction of flow of the liquid flow stream for enhancing screening of even relatively thin solid waste materials without significantly impeding the flow stream. The bars of the screen preferably are formed with a plurality of flow apertures in their active region which further minimizes head losses in the system and enhances screening of solid materials. A power operated two-directional rake is provided for more efficiently removing solid material that accumulate on the bar screen. Projections on the rake engage the bar screen only in one direction of the rake's movement and means are provided for forcing a close-fitting relationship between the rake projections and the screen bars during the raking operation.

28 Claims, 3 Drawing Sheets

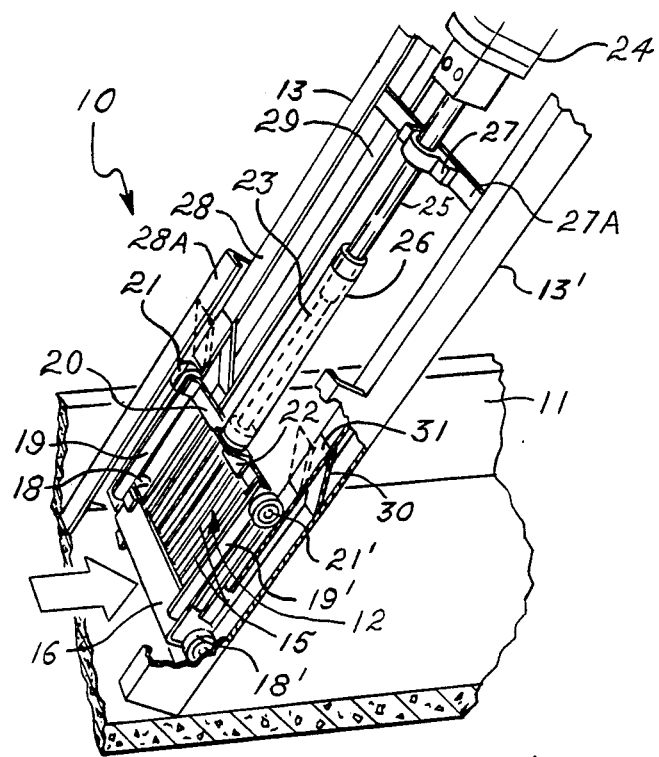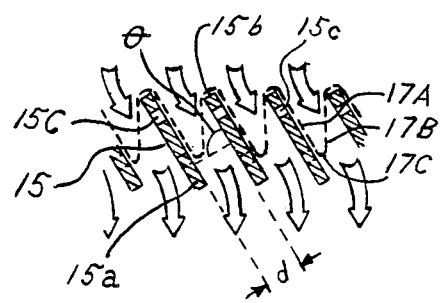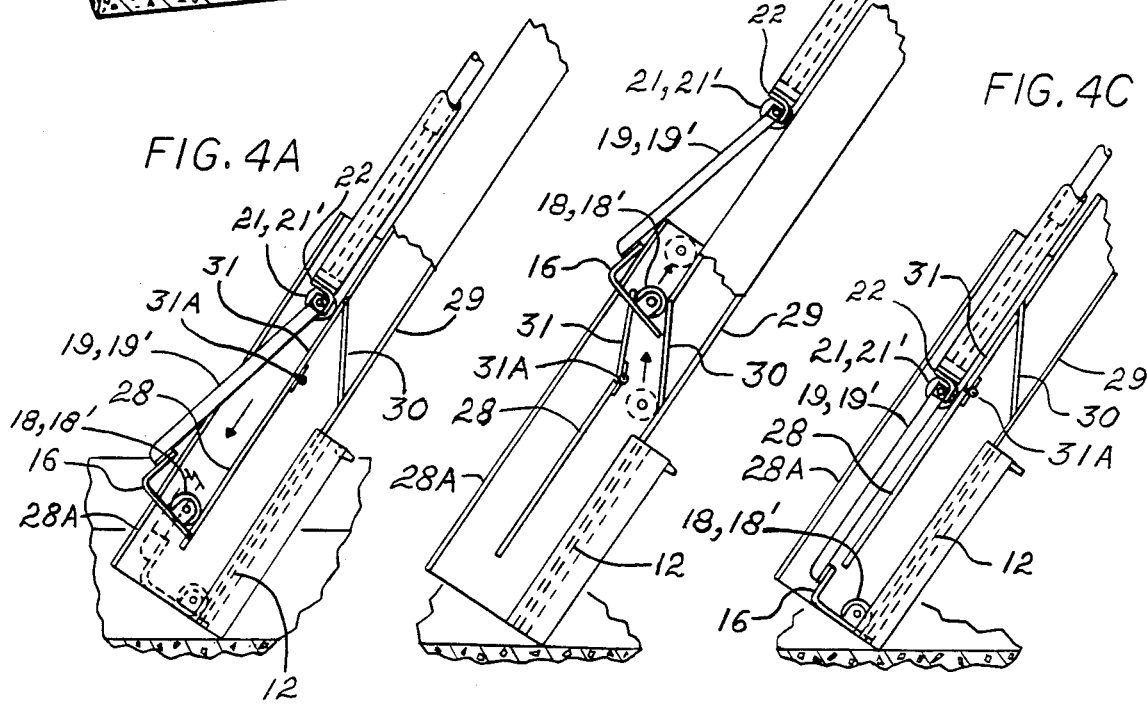

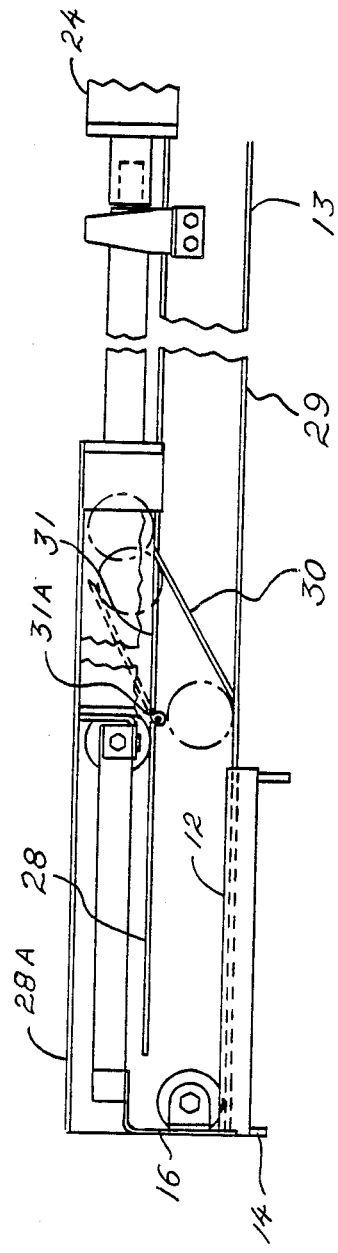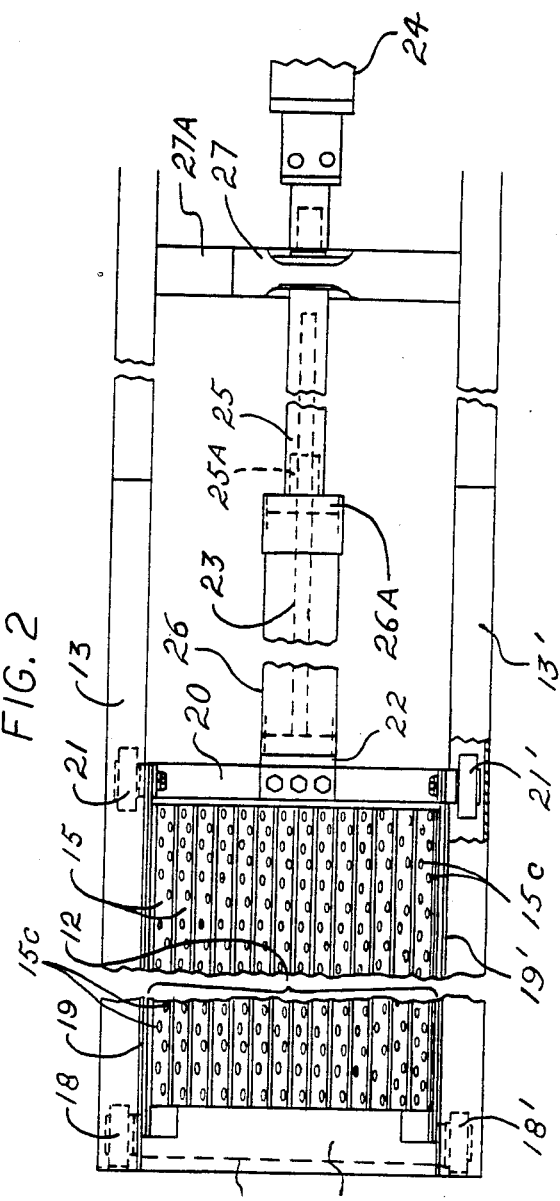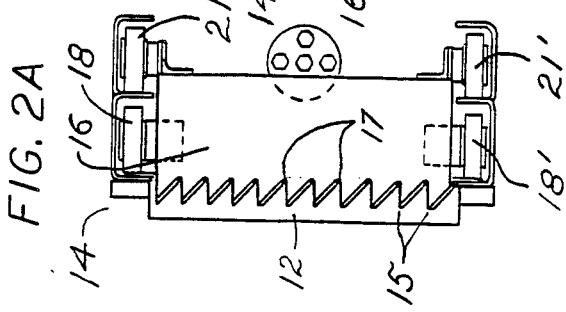

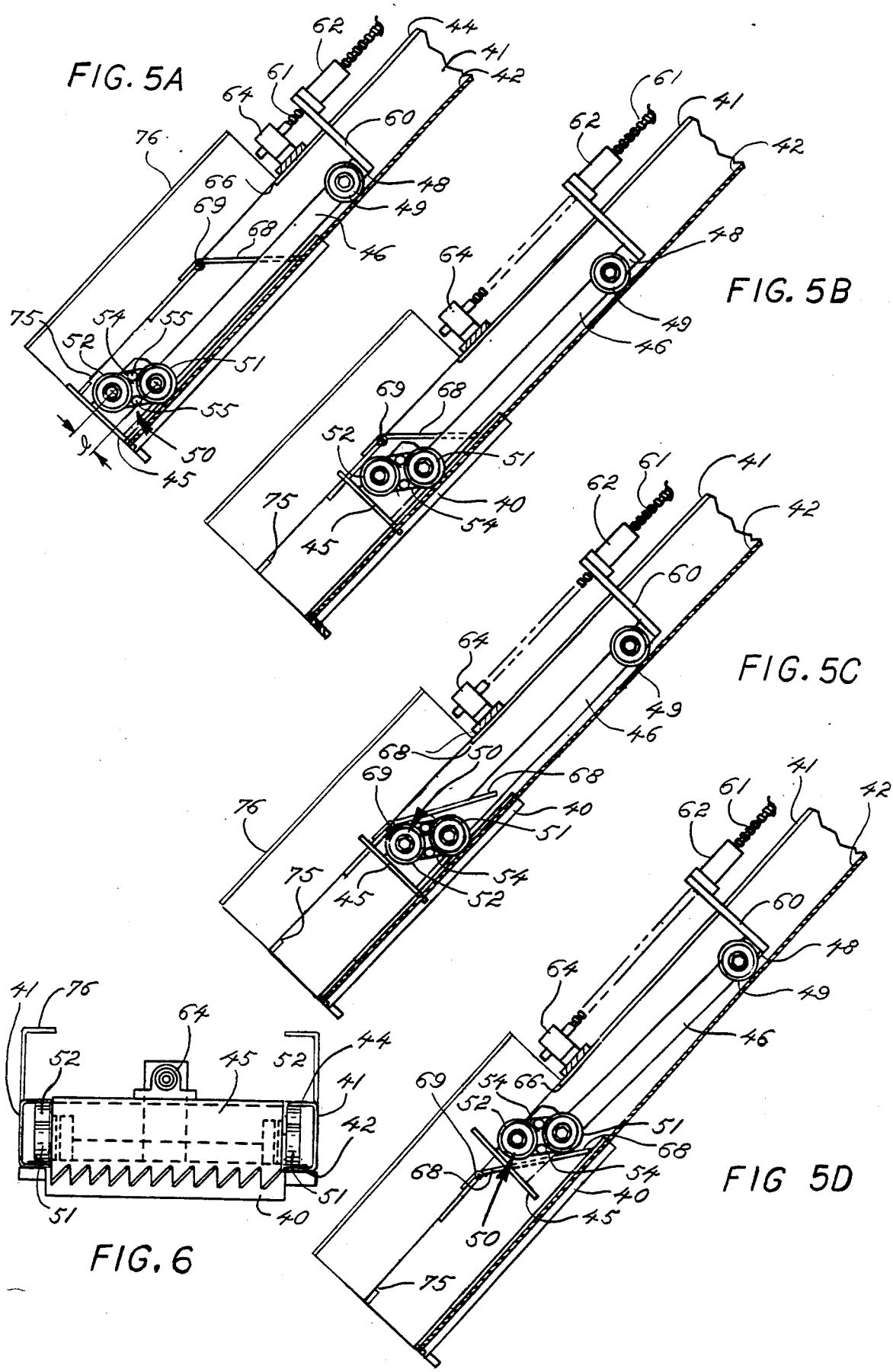

BAR SCREENING APPARATUS

CROSS-REFERENCE TO RELATED APPLICATION

This application is a continuation-in-part of application Serial No. 784,226, filed Oct. 4, 1985, now abandoned entitled, "Improved Bar Screening Apparatus."

BACKGROUND OF THE INVENTION

The present invention generally relates to an apparatus for removing solids from liquid flow streams, and more particularly, to an improved bar screen apparatus for such purpose.

Screens comprising a plurality of bars in closely spaced side-by-side relation so as to define a plurality of narrow elongated flow openings having a width narrower than the width of solid materials to be screened are commonly utilized in a variety of processing systems for separating solid materials from a liquid flow stream. Typical applications include waste treatment systems for removing solid waste materials from a liquid stream, fruit and vegetable washing systems for removing the cleaned fruit and vegetables from the liquid stream in which they are washed, and food processing operations for removing potato peelings, fruit skins and the like from the liquid processing stream. Such conventional bar screens, however, have the disadvantage that solids of any length, having a width narrower than the width of the spacing between the bars, can pass through the screen, and thus, either contaminate the downstream processing line or require further screening or filtering of the flow stream. When a screen is designed with more closely spaced bars in an effort to minimize such undesirable passage of solids through the screen, such screens have been found to unduly restrict the liquid flow, resulting in increased head losses in the system. Conventional screens have experienced further problems in connection with the efficient removal of solids that adhere and accumulate around the screen bars during the screening process.

SUMMARY OF THE INVENTION

It is an object of the present invention to provide an improved bar screen apparatus that is adapted for the more effective and efficient removal of solids from a liquid flow stream without significantly impeding the liquid flow.

Another object of the present invention is to provide a bar screen apparatus as characterized above that is adapted to screen and obstruct the flow of most solids that are even narrower than the spacing between the bars of the screen.

A further object is to provide a screen apparatus of the foregoing type with an improved raking device for the efficient removal of solids that accumulate on the screen.

Still another object is to provide an improved bar screen apparatus of the above kind that is of relatively simple construction, and thus, lends itself to economical manufacture and reliable use.

Yet another object is to provide a screen apparatus with an improved raking device which is conveniently adapted to being automatically driven by a variety of driving means.

Accordingly, the screening apparatus of the present invention incorporates a new and improved design for the arrangement of the bars which constitute the screen. More specifically, the screen bars are designed to be in a substantially parallel relation to each other while at the same time being disposed at an acute angle to the overall direction of flow. According to a preferred embodiment of this invention, the screen bars are disposed in such a manner that the trailing end of any bar is substantially in longitudinal alignment with the leading end of the adjacent bar. Such an arrangement allows more efficient screening of finer particles without the corresponding increase in head losses due to decreased flow rates that would occur when conventional systems are adapted for the screening of fine particles.

As a further feature of this invention, the screen bars are designed to include a plurality of apertures along their active region, which further minimizes head losses while facilitating the screening process.

Increased efficiency in the removal of accumulated screened solid material is achieved, according to this invention, by the provision of an improved raking device that fits into the spaces between the screen bars and can be conveniently displaced laterally, by manual or automatic means, in order to remove accumulated solid material from the screening area. Means are further provided for maintaining the raking device in operative engagement with the screen during the raking operation.

The disclosed bar screening apparatus provides simple, convenient, efficient and easily automated screening as described below in detail.

BRIEF DESCRIPTION OF THE DRAWINGS

The invention and other objects and advantages thereof, may best be understood by referring to the following description in conjunction with the accompanying drawings, in which:

FIG. 1 is a perspective view of an illustrative bar screening apparatus according to the preferred embodiment of this invention;

FIG. 2 is a top view of the bar screening apparatus shown in FIG. 1;

FIG. 2A is an end view of the apparatus of FIG. 1 showing the placement of the screen bars and the engagement of the raking device with the bar screen;

FIG. 2B is a side view showing the support rails and the ramp/flap arrangement for controlling the lateral displacement of the raking device;

FIG. 3 is a fragmentary section of the bar screen illustrating the angular orientation and displacement of the bars and the flow paths for the liquid stream;

FIGS. 4A-C are perspective side views of the apparatus of FIG. 1, showing the raking device at three different positions along its lateral displacement path and illustrate the operation of the ramp/flap arrangement;

FIGS. 5A-D are perspective side views of FIG. 1, showing an alternative embodiment of the invention which provides the raking device with improved lateral displacement and raking action;

FIG. 6 is an end view of the screening apparatus shown in FIG. 5A.

DESCRIPTION OF THE PREFERRED EMBODIMENT

Referring now more particularly to FIGS. 1 and 2 of the drawings, there is shown a bar screening apparatus 10 embodying the present invention disposed within an illustrative flow channel 11 through which a liquid flow stream is passing in the direction of the arrow. It will be understood by one skilled in the art that the flow channel 11 may be part of a waste treatment system, a fruit or vegetable washing or processing operation, or any other like process system in which the flow stream carries solids that must be separated and removed from the liquid stream. The illustrated screening apparatus 10 includes a screen 12 consisting of a support bar 14 (FIGS. 2 and 2A) to which a plurality of flat bars 15 are affixed in closely spaced parallel relation and define a plurality of narrow elongated flow openings. The bar screen 12 is mounted on a pair of support rails 13, 13' in the flow stream in order to perform the screening function. The bar screen 12 in this case lies in a plane with the upper end thereof slanted in a downstream direction.

In accordance with the invention, the bars of the bar screen each have an upstream relative flat face disposed at an acute angle to the direction of the flow stream so as to effect screening of even relatively thin solid waste materials without significantly restricting liquid flow through. Preferably, the leading edge of one bar is in substantially longitudinal alignment with the trailing end of the adjacent bar. Such an arrangement effectively prevents a direct gap from being offered to solid materials in relation to the direction of flow by presenting a virtual plane of obstruction perpendicular to the flow of solid particles, yet defining sufficiently wide openings between adjacent bars to allow the substantially unimpeded flow of the liquid portion of the flow stream.

The illustrated bars 15, as best shown in FIG. 3, are positioned at a perpendicular distance "d" from each other with the upstream face of each bar being disposed at an angle $\theta$ with respect to the direction of flow stream travel. The choice of the separation "d" between the bars and the angle $\theta$ preferably is made in such a way that the leading end 15a of one bar is in substantial longitudinal alignment with the trailing end 15b of the adjacent bar. Such angular displacement of the bars 15 prevents a direct flow path for solid materials in the flow direction and causes the solids to come into contact with and begin adhering to the surfaces of the bars. On the other hand, such an arrangement permits easy flow through of the liquid portion of the stream which follows the path existing by virtue of the perpendicular separation between adjacent bars, as indicated by the arrows in FIG. 3. Hence, regardless of various sized solids in the flow stream, the liquid will flow through the bars 15 of the screen 12 without substantial obstruction, thereby preventing head losses in the system, while the solids within the stream are obstructed by the bars. It will be understood by those skilled n the art that the angle $\theta$ and the perpendicular separation 'd' between the bars may be varied for effectively screening particles of different sizes and types.

According to another feature of the invention, the bars of the screen are formed with a plurality of apertures 15c which function to further reduce the head losses by allowing an increased volume of liquid to flow through at a given time, and which also facilitate the screening process by acting as collection points where the adherence of solid particles is initiated and gradually builds up. The provision of such apertures particularly increases the screening efficiency when the flow stream contains long and thin solid material, such as strips of paper or like objects, potato skins, fruit peelings or other such leaf-like matter, the screening of which often is difficult and inefficient when using conventional bar screening techniques. In the illustrative bar screen, the increased exposed surface area of the bars by virtue of the apertures therein provide improved screening of such fine solid particles, and the effectiveness of the apertures is enhanced because of the angular orientation of the bars. The diameter of the apertures is designed such that the apertures do not detract from the mechanical strength of the screen bars.

For the purpose of removing the solids accumulated on the bar screen as a result of the screening process, the screening apparatus is provided with a raking device that includes a rake 16 which has a series of projections 17 designed to fit between the bars 15 of the bar screen 12. As first shown in FIGS. 2A and 3, the projections 17 on the rake 16 are formed with a slanted edge or side 17A which has a slope corresponding to the positional angle $\theta$ of the screen bars 15 so that the edge or side 17A can ride in close adjacent relation to the upstream face of the bar. The other edge or side 17B of each projection 17 is vertically oriented and is connected to the slanted side 17A by a rounded end 17C. Such an arrangement permits the placement of the rake projections 17 between the slanted bars 15 of the screen 12 so that when the rake is moved laterally along the bars of the screen, it effectively removes the solid material that has accumulated or is adhering to the surfaces of the screen bars. In the illustrated embodiment, as indicated in FIG. 3, the apertures 15c are formed in the bars in that portion of the bar which are contacted by the projection 17 during the raking stroke.

For supporting the rake for lateral movement along the rails 13, 13', the rake 16 is supported at it opposed end by rollers 18, 18'. The rake 16 also is connected through a pair of linking arms 19, 19' to a cross brace 20, which in turn is supported for movement on the rails 13, 13' by a pair of rollers 21, 21'. The linking arms 19, 19' are fixedly secured to the rake 16, but are pivotably connected to the shaft for the rollers 21, 21' so that the rake and linking arms can be pivoted relative to the cross brace 20.

For operating the raking device to effect the removal of accumulated solids from the screen, the rake 16 is coupled to a suitable drive means. For this purpose an L-shaped plate 22 is mounted on the cross brace 20, from which a ball-bearing screw 23 is fixedly coupled in upwardly extending relation. As best shown in FIG. 2, the ball-bearing screw 23 operatively engages a ball-bearing nut 25A fixedly mounted within a tubular drive shaft 25 of a suitable drive motor 24. Rotational driving movement of the tubular drive shaft 25 will rotate the ball-bearing nut 25A contained therein, causing the ball-bearing screw 23 and the rake 16 coupled thereto to be advanced or retracted relative to the ball-bearing nut 25A and the screen 12. The end of the ball-bearing screw 23 is moved upwardly into the tubular shaft 25 upon raising movement of the rake. The ball-bearing screw 23, as is known, requires extremely reduced energizing torque and contributes towards minimal power requirements for operating the rake. The screw 23 in this case is covered on its end proximate to the cross brace 20 by a protective tube 26 which extends over the lowermost active area of the screw 23 and a protective seal 26A is provided on the end of the tube to prevent exposure to the surroundings. The tubular drive shaft 25 for the ball-bearing screw 23 in this instance is supported by a ball-bearing housing 27, which in turn is carried by a main support plate 27A fixed between the support rails 13 and 13'.

In accordance with a further aspect of the invention, provision is made for raising and lowering of the rake body relative to the screen in such a way that the projections on the rake body make contact with the bar screen in one direction of movement over the screen and are displaced from the screen during return movement in the opposite direction. For this purpose, the support rails 13 and 13' have an upper guide rail 28 and a lower guide rail 29, with a ramp plate 30 connecting the upper and lower guide rails at a point at or beyond the upper end of the bar screen 12. A section of the upper guide rail 28, specifically the portion facing the ramp plate 30, is formed with an opening within which a flap plate 31 is pivotably attached by means of a hinge 31A (FIG. 2B) allowing the flap plate 31 to be pivoted between a position in the plane of the rail 28 (FIG. 4A) and a raised position (FIG. 4B). In this way the flap plate 31 has the capability of upward movement relative to the upper guide rail 28, while its downward movement is prevented because of the fixed ramp plate 30 immediately below the free end of the flap plate 31. The supports 13, 13' in this case have inwardly directed flanges or rails 28A that are disposed over each of the upper guide rails 28 and 10 for protecting the guide rails from exposure to waste materials.

The operation of the raking device is illustrated in FIGS. 4A–C. For illustrative purposes it will be assumed that the raking device is located on the upper rail 28 before a raking cycle begins. In this position the pair of cross brace rollers 21, 21' as well as the rake support rollers 18, 18' are on the upper rail 28 (FIG. 4A). The motor 24 can then be actuated to rotate the shaft 25 and nut 25A in a direction which lowers the ball-bearing screw 23 and moves the rake cross brace 20, and hence the rake 16, in a generally downward direction along the length of the upper rail 28, by the rolling motion of rollers 21, 21' and 18,18', respectively. Since the length of the upper rail 28 is less than that of the lower rail 29 the rollers 18, 18' of rake body 16 eventually drop from the end of the top rail 28 onto the lower guide rail 29 at a location adjacent the bottom of the screen.

It will be noted that this displacement of the rake 16 and the rollers 18 and 18' is possible because of the pivotal connection of the link arms 19, 19' to the cross brace 20 and produces no radial shift in the position of the ball-bearing screw 23. This is a distinct advantage since the drive motor and shaft 25 may be rigidly anchored without need for means to accommodate any radial motion of the ball-bearing screw. The displacement of the rake 16 onto the lower rail 29 brings the projections 17 of the rake body into close fitting relation in the spaces between the screen bars 15 (see FIG. 2A). At this point the upper portion of the raking device, as defined by the cross brace 20 and the rollers 21, 21', is still positioned on the upper rail 28. Once the rake body 16 is in operative position with its projections 17 disposed between the bars 15 of the screen 12, the motor is operated to drive the ball-bearing screw 23 in a reverse direction. The ball-bearing screw 23 then starts retracting and pulls the raking device up with the rollers 18, 18' riding on the lower guide roll 29 and the cross brace rollers 21, 21' riding on the upper rail 28. As a result, the rake 16 is pulled along with the projections 17 positioned in the gaps between the screen bars, thereby scraping away all accumulated solid material from the surface of the screen. Such raking movement continues until the rollers 18, 18' encounter the ramp plate 30 on the lower rail. (FIG. 4B).

At this point, the rollers 18, 18' start moving upwardly along the incline offered by the ramp plate 30 (FIG. 4C) as the screw 23 continues to pull the rake 16 in an upward direction. As the rake moves along the ramp plate, its rollers 18, 18' make contact with the flap plate 31 and continue moving up and onto the upper rail without obstruction because the flap plate 'opens' upwardly by the freedom of the pivotal motion provided by the hinge 30A. Once the rake rollers 18, 18' have moved beyond the ramp plate 30 the flap plate 31 falls back under its own weight to form a continuous path along the upper rail for the return motion of the rake rollers 18, 18'. A torsion spring may also be used with the hinge 31A to ensure proper closing of the ramp plate 31.

During the ascent of the rake 16 over the inclined ramp plate and the subsequent motion along the upper rail to the end of the raking stroke, the linking arms 19,19' provide the pivotal motion of the rake with respect to the cross brace 20 because of the rotatable connection of the arms to the cross brace. Thus, throughout the raking stroke there is no radial motion of the ball-bearing screw 23 on the drive shaft 25. The effect of the foregoing cycle of operation is that the projections on the rake body contact the bar screen only when it is raking away the solid particles accumulated on it and no such contact occurs during its return to the lower end of the bar screen, thereby preventing any obstruction to the flow stream and dislodging of adhering particles back into the flow stream. An added advantage of such drive arrangement is that the drive operating mechanism is maintained above the liquid level throughout the screening process. Although the screen apparatus is generally mounted at an angle of 45°–60° with respect to the flow stream, certain applications require mounting angles of up to 90°. In such cases there is some chance of the rake body rollers slipping off the upper guide rail during the return movement of the rake along the rails 28. The presence of the upper rail 28A constrains any such displacement of the rake body rollers.

Referring now to FIG. 5A, there is shown an alternative embodiment of a bar screening apparatus according to the present invention. This embodiment provides an improved mechanism for supporting the rake device for lateral displacement across the length of the bar screen and for maintaining the raking device in engagement with the bar screen for effecting relatively thorough removal of accumulated solids therein. To this end, the raking device is provided with a dual roller arrangement which, in addition to providing smooth lateral displacement of the rake device, serves as a means for maintaining the projections of the rake device in between the bars of the bar screen as the raking action progresses.

As shown in FIG. 5A, the bar screening apparatus includes a screen 40, similar to that previously described, mounted at the lower end of a pair of support rails 41 disposed at an angle to the vertical. The support rails 41 in this case include a lower guide rail 42 and an upper guide rail 44. A rake 45, shown in FIG. 5A in a ready position at the lower end of the screen 40, is affixed to the lower end of linking arms 46, which are pivotably coupled to a cross brace member 48, in a manner similar to that previously described.

For supporting the rake 45 for translational movement with respect to the screen, a pair of forward rollers 49 are disposed at opposite ends of the cross brace 48 and a dual roller arrangement 50 is provided at opposed ends of the rake 45. The dual roller arrangements 50 each comprise a lower roller 51 mounted in the plane of the linking arms 46 and the forward rollers 49, and a roller 52 mounted in raised offset relation to the lower roller 51 on a support plate 54 which is secured to the ends of the rake 45 by bolts 55. Each support plate 54 preferably is adjustably mountable on the rake so that the upper rollers 52 may be disposed at a selected elevated distance "1" above the plane of the linking arms 46 and the lower roller 51.

In order to operate the rake 45, the rake again is coupled to a suitable drive means capable of displacing the rake through the bar screen according to a predefined sequence of motion. In this embodiment, an L-shaped plate 60 is attached to the the cross brace 48 and carries a ball-bearing nut 62, which operatively engages a ball screw 61. The ball screw 61 is coupled at one end to a bearing 64 for relative rotational movement, the bearing 64 being mounted on a plate 65 running across the support rails 41. The other end of the screw 61 may be driven by a suitable drive motor for moving the nut 62 and the rake 45 connected thereto rotative to the screw 61 and the screen 40.

In keeping with the invention, means including a single pivotable ramp is provided for raising the rake relative to the screen after a raking operation and for permitting return of the rake to a ready position. To this end, each upper guide rail 44 is formed with a cut out 66 and a flap plate 68 is pivotably secured to the upper guide rail 44 in the cut out 66 by means of a hinge 69. Each flap plate 68 is moveable from a normal downwardly pivoted position, as shown in FIG. 5, with a lower end thereof engaging the lower guide rail 42 and a raised position that permits movement of the rake past the flap plate 68 upon completing a raking stroke. Thus, it can be seen that after the rake 45 has been moved from its ready position (FIG. 5A) and is about to complete the raking operation (FIG. 5B) the dual roller arrangement 50 will come into contact with the pivotable flat plates 68 and proceed to push the flap plates upwardly about its hinge 69 (FIG. 5C). Once the rollers 51, 52 have progressed beyond the flat plates 68, the flap plates will fall downwardly by gravity against the lower guide rails 42 under their own weight and subsequently serve as a ramps connecting the upper and lower guide rails 44, 42.

At this time, the drive motor may be operated in the opposite direction so that the rake is moved in a reverse direction. In this direction of movement, the lower rake rollers 51 will encounter the flap plates 68, which now functions as ramps connecting the upper and lower guide rails 42, 44, and the rollers will be directed back onto the upper guide rail 44, moving the projections of the rake 45 away from their operative positions between the bars of the screen 41. Continued reverse movement of the rake 45 and rollers 51 on the upper guide rail will bring the rollers 51 to a cut out sections 75 adjacent the bottom of the upper guide rails 44, at which point the rollers will drop back onto the lower rails 42 positioning the rake 45 in its ready position for the next cycle of operation. Since the dual roller arrangement 50 and linking arms 46 pivot about the cross brace 48, such movement of the rake again requires no angular movement of the ball-bearing screw 61. The supports 41 in this case each are provided with a further flange or rail 76 which extends over the lower portion of the upper guide rail 44 for preventing contaminates from entering the cut out 75 in the upper guide rail.

In accordance with a further feature of the invention, the dual roller arrangements 50 cooperate with both the upper and lower guide rails 42, 44 of the supports 41 for maintaining the rake projections in reliable engaging relationship between the bars of the screen 40 during the raking operation. For this purpose, the support plates 54 for the rollers 51, 52 are adjusted such that during the raking operation the lower rollers 51 ride on the upper surface of the lower guide rails 42 and the upper rollers 52 engage the underside surfaces of the upper guide rails 44. Hence, notwithstanding significant accumulation and built up of waste products on the screen, the rake projections are maintained in reliable engagement with the bar screen so as to effect relatively complete and thorough removal thereof. As described previously, as the rake nears completion of the raking stroke the rollers 51, 52 will pass through and under the flap plates 68, enabling the flat plates to be used as a ramp for guiding return movement of the rake onto the upper guide rail. Preferably the rollers 51, 52 are angularly disposed with respect to each other in a plane substantially parallel to that of the ramp plates 68 when in lowered position, the result of which is that both the upper and lower rollers 51, 52 tend to engage and force the plate in its upward pivotal movement.

It will be understood by those skilled in the art that a variety of driving mechanisms, using hydraulic, pneumatic or electric means, may be used to produce the raking actions, i.e., the actuation of the alternative downward and upward linear movement of the rake. Further, the raking process may be made completely automatic by linking the drive mechanism to some form of sensing means which tracks the position of the raking device in order to control the alternating directions required of the drive mechanism. For example, magnetic rings can be mounted over either end of the protective tube FIGS. 1–4 and magnetic sensors which are suitably mounted on the guide rails can be used to determine the start and end of the required downward and upward motion of the ball-bearing screw and hence the rake. It is also apparent that in the application of this invention to wider and deeper flow channels which require larger bar screens and hence larger raking devices, a plurality of ball-bearing screws may be used to drive the rake, with the screws being connected through suitable bevel gears or like elements to a central drive mechanism so that the motion of all the screws is adequately synchronized.

From the foregoing, it can be seen that the bar screening apparatus of the present invention provides increased efficiency in the screening of fine solid particles within a flow stream, by using an improved bar screen which results in increased flow rates and minimal head losses and by using an improved raking device which may be automatically driven to efficiently and positively remove solid particles accumulated on and/or adhering to the bar screen as a result of the screening process.

While the invention is susceptible of various modifications and alternative constructions, only certain preferred embodiments have been shown in the drawings and described above in detail. It should be understood, however, that there is no intention to limit the invention to the specific form described but, on the contrary, the intention is to cover all modifications, alternative constructions and equivalents falling within the spirit and scope of the appended claims.

I claim as my invention:

1. A solids screening apparatus comprising a flow channel for directing a solids containing liquid flow strean along a predetermined path corresponding substantially to the longitudinal axis of said flow channel, a bar screen transversely mounted at a predetermined location in said flow channel, said bar screen including a plurality of bars each having an upstream face with a leading upstream edge on one side thereof and a trailing downstream edge on the other side thereof, means for mounting said bars in parallel spaced relation to each other to define elongated liquid flow openings therebetween, and said bars each being supported by said mounting means such that the lines of intersection of said upstream faces with a horizontal plane each is disposed at an acute angle to the longitudinal axis of said flow channel at said predetermined location with the leading edge of each bar being in substantial alignment with the trailing edge of an adjacent bar when viewed along said longitudinal axis.

2. The apparatus of claim 1 in which said bars each are formed with a plurality of flow apertures for permitting passage of liquid of said flow stream.

3. The apparatus of claim 1 including a reciprocatable rake engageable with the upstream faces of said bars for removing solid material accumulated thereon.

4. The apparatus of claim 3 including means for raising and lowering said rake relative to said bar screen, and means supporting said rake in engaged relation with said bar screen during said raising movement and in spaced relation to said bar screen during lowering return movement.

5. The apparatus of claim 4 in which said rake has a plurality of projections which each extend between adjacent bars of said bar screen when said rake is in engaged relation with said bar screen.

6. The apparatus of claim 5 in which said projections each have a generally V-shaped configuration, said projection being formed with one face that is positionable in substantially parallel adjacent relation to the upstream face of a respective one of said bars and a second side that is positionable against an upstream end of an adjacent bar.

7. A solids screening apparatus comprising a flow channel for directing a solids containing liquid flow stream along a predetermined path corresponding substantially to the longitudinal axis of said flow channel, a bar screen transversely mounted at a predetermined location in said flow channel, said bar screen consisting of a plurality of bars each having a substantially flat upstream face with a leading upstream edge on one side thereof and a trailing downstream edge on the other side thereof, means for mounting said bars in substantially parallel relation to each other for defining a plurality of elongated flow openings, said bars each being supported by said mounting means such that the lines of intersection of said upstream faces with a horizontal plane each is disposed at an acute angle to the longitudinal axis of said flow channel at said predetermined location with the leading edge of each bar being in substantial alignment with the trailing edge of an adjacent bar when viewed along said longitudinal axis, a rake having a plurality of projections each adapted to fit between respective adjacent bars of said bar screen in close relation to the upstream faces of said bars, and means supporting said rake for movement in one direction relative to said bar screen with said projections in close fitting relation to said bars for removing solids accumulated thereon and for movement in an opposite return direction with said projections disposed in an outwardly spaced relation with respect to said bars, drive means for moving said rake relative to said bar screen, and means for maintaining said close-fitting relationship between said rake projections and said bars when rake is moving in said first direction.

8. The apparatus of claim 7 in which said bars each are formed with a plurality of apertures therein through which liquid of said flow stream may pass.

9. The apparatus of claim 7 including front and rear roller means supporting said rake for translational movement relative to said bar screen, and guide rail means for supporting said rollers.

10. The apparatus of claim 9 in which said drive means includes a drive motor, and coupling means connecting said rake to said drive motor.

11. The apparatus of claim 10 in which said coupling means includes pivotal connecting means for permitting pivotal movement of said rake relative to said drive motor.

12. The apparatus of claim 9 in which said guide rail means includes an upper guide rail and a lower guide rail, said guide rails each having upper and under surfaces, said roller means include upper and lower rollers, said lower guide rail supporting said lower rollers on its upper surface during rake movement in said first direction of movement and said upper guide rail supporting said lower rollers on its upper surface for rake movement in the opposite return direction, said upper rollers being adapted to contact and roll along the under surface of said upper guide rail during rake movement in said first direction in such a way as to maintain said close-fitting relationship between the rake projections and the screen bars.

13. The apparatus of claim 12 further including means connecting said rake to a cross member supported by a pair of rollers, and means connecting said cross member to said drive motor.

14. The apparatus of claim 13 including pivotal connecting means coupling said cross member to said drive means.

15. The apparatus of claim 12 in which said rollers are moveable under their own weight from said upper guide rail to said lower guide rail upon completion of movement in said return direction of rake movement.

16. The apparatus of claim 12 wherein the upper guide rail is formed with a cutout portion, said portion having a pivotable plate mounted in such a manner that said plate normally leans downward and rests against the lower guide rail to form a ramp which permits movement of rake rollers and hence the rake from said lower guide rail to said upper guide rail during rake movement in said return direction, said plate being temporarily displaceable upwards as the rake rollers contact the plate when moving along the lower guide rail during movement in said first direction.

17. A bar screening apparatus for the screening of solid materials from a liquid flow stream comprising a flow channel for directing a solids containing liquid flow stream along a predetermined path corresponding substantially to the longitudinal axis of said flow channel, a bar screen transversely mounted at a predetermined location in said flow channel, said bar screen consisting of a plurality of bars each having a substantially flat upstream face with a leading upstream edge on one side thereof and a trailing downstream edge on the other side thereof, means for mounting said bars in substantially parallel relation to each other for defining a plurality of elongated flow openings, said bars each being supported by said mounting means such that the lines of intersection of said upstream faces with a horizontal plane each is disposed at an acute angle to the longitudinal axis of said flow channel at said predetermined location with the leading edge of each bar being in substantial alignment with the trailing edge of an adjacent bar when viewed along said longitudinal axis, a rake having a plurality of projections each adapted to fit between respective adjacent bars of said bar screen in close relation to the upstream faces of said bar screen in close relation to the upstream faces of said bars, and means supporting said rake for movement in one direction relative to said bar screen with said projections in close fitting relation to said bars for removing solids accumulated thereon and for movement in an opposite return direction with said projections disposed in an outwardly spaced relation with respect to said bars.

18. The apparatus of claim 17 in which said bars each are formed with a plurality of apertures therein through which liquid of said flow stream may pass.

19. The apparatus of claim 18 including roller means supporting said rake for translational movement relative to said bar screen, and guide rails means for supporting said rollers.

20. The apparatus of claim 19 in which said drive means includes a drive motor, and coupling means connecting said rake to said drive motor.

21. The apparatus of claim 20 in which said coupling means includes pivotal connecting means for permitting pivotal movement of said rake relative to said drive motor.

22. The apparatus of claim 21 including a ramp connecting said lower guide rail to said upper guide rail for permitting movement of said rake rollers from said lower guide rail to said upper guide rail during movement in said first direction, said upper guide rail being formed with a cutout portion adjacent said ramp, a pivotable plate mounted in said cutout in such a way that said pivotable plate is moved upwardly by the force of said rollers upon movement on said ramp in said first direction of travel, and said plate being pivotable, into coplaner relationship with said upper guide rail to permit movement of said rake rollers on said upper guide rail in said return direction.

23. The apparatus of claim 22 including biasing means for biasing said pivotable plate into coplaner relationship with said upper guide rail.

24. A solids screening apparatus comprising a flow channel for directing a solids containing liquid flow stream along a predetermined path corresponding substantially to the longitudinal axis of said flow channel, a bar screen transversely mounted at a predetermined location in said flow channel, said bar screen including a plurality of bars each having an upstream face with a leading upstream edge on one side thereof and a trailing downstream edge on the other side thereof, means for mounting said bars in parallel spaced relation to each other to define elongated liquid flow openings therebetween, and said bars each being supported by said mounting means such that the lines of intersection of said upstream faces with a horizontal plane each is disposed at an acute angle to the longitudinal axis of said flow channel at said predetermined location with the trailing edge of each bar transversely offset from the leading edge of the bar when viewed along said longitudinal axis.

25. A solids screening apparatus comprising a flow channel for directing a solids containing liquid flow stream along a predetermined path corresponding substantially to the longitudinal axis of said flow channel, a bar screen transversely mounted at a predetermined location in said flow channel, said bar screen consisting of a plurality of bars each having a substantially flat upstream face with a leading upstream edge on one side thereof and a trailing downstream edge on the other side thereof, means for mounting said bars in substantially parallel relation to each other for defining a plurality of elongated flow openings, said bars each being supported by said mounting means such that the lines of intersection of said upstream faces with a horizontal plane each is disposed at an acute angle to the longitudinal axis of said flow channel at said predetermined location with the trailing edge of each bar transversely offset from the leading edge of the bar when viewed along said longitudinal axis, a rake having a plurality of proejctions each adapted to fit between respective adjacent bars of said bar screen in close relation to the upstream faces of said bars, and means supporting said rake for movement in one direction relative to said bar screen with said projections in close fitting relation to said bars for removing solids accumulated thereon and for movement in an opposite return direction with said projections disposed in an outwardly spaced relation with respect to said bars, drive means for moving said rake relative to said bar screen, and means for maintaining said close-fitting relationship between said rake projections and said bars when rake is moving in said first direction.

26. The apparatus of claim 25 in which said drive means includes a drive motor, and a ball screw assembly coupled between said drive motor and said rake.

27. A bar screening apparatus for the screening of solid materials from a liquid flow stream comprising a flow channel for directing a solids containing liquid flow stream along a predetermined path corresponding substantially to the longitudinal axis of said flow channel, a bar screen transversely mounted at a predetermined location in said flow channel, said bar screen consisting of a plurality of bars each having a substantially flat upstream face with a leading upstream edge on one side thereof and a trailing downstream edge on the other side thereof, means for mounting said bars in substantially parallel relation to each other for defining a plurality of elongated flow openings, said bars each being supported by said mounting means such that the lines of intersection of said upstream faces with a horizontal plane each is disposed at an acute angle to the longitudinal axis of said flow channel at said predetermined location with the trailing edge of each bar transversely offset from the leading edge of the bar when viewed along said longitudinal axis, a rake having a plurality of projections each adapted to fit between respective adjacent bars of said bar screen in close relation to the upstream faces of said bars, and means supporting said rake for movement in one direction relative to said bar screen with said projections in close fitting relation to said bars for removing solids accumulated thereon and for movement in an opposite return direction with said projections disposed in an outwardly spaced relation with respect to said bars.

28. The apparatus of claim 27 in which said projections each have a generally V-shaped configuration, said projections each being formed with one face that is positionable in parallel adjacent relation to the upstream face of a respective one of said bars and a second side that is disposed at an acute angle of said one side.

* * * * *